United States Patent [19]

Kambayashi et al.

[11] Patent Number: 4,841,289

[45] Date of Patent: Jun. 20, 1989

[54] INTERFACE CIRCUIT FOR ADAPTING A MULTI-SCAN MONITOR TO RECEIVE COLOR DISPLAY DATA FROM VARIOUS TYPES OF COMPUTERS

[75] Inventors: Koji Kambayashi, Chiba; Nobuyuki Okamoto, Tokyo; Kenichiro Kawanami, Kanagawa, all of Japan

[73] Assignee: Sony Corporation, Tokyo, Japan

[21] Appl. No.: 47,679

[22] Filed: May 6, 1987

[30] Foreign Application Priority Data

May 12, 1986 [JP] Japan ................................ 61-107994

[51] Int. Cl.[4] ................................................ H04N 9/12

[52] U.S. Cl. .................................... 340/703; 340/720; 340/723

[58] Field of Search ................ 340/703, 721, 720, 723

[56] References Cited

U.S. PATENT DOCUMENTS

| | | | |
|---|---|---|---|
| 4,149,184 | 4/1979 | Giddings et al. | 340/703 |
| 4,183,046 | 1/1980 | Dalke et al. | 340/703 |
| 4,641,282 | 2/1987 | Ounuma | 340/703 |
| 4,673,930 | 6/1987 | Bujalski et al. | 340/721 |
| 4,684,935 | 8/1987 | Fujisaku et al. | 340/721 |

*Primary Examiner*—John W. Caldwell, Sr.
*Assistant Examiner*—Alvin Oberley
*Attorney, Agent, or Firm*—Philip M. Shaw, Jr.

[57] ABSTRACT

A monitor interface circuit for adapting a color display monitor to a selected one of various types of computers which generate different types of color display data receives the display data and one of several horizontal scanning frequency signals from the computer and mixes the display data as a function of the one horizontal scanning frequency to thereby generate a proper display signal for the monitor.

4 Claims, 2 Drawing Sheets

| | | $6_1$ | $6_2$ | $6_3$ | $6_4$ | $6_5$ |
|---|---|---|---|---|---|---|
| MS | $MS_1$ | 1 | 0 | 0 | 0 | 1 |
| | $MS_2$ | 0 | 0 | 1 | 1 | 1 |
| | $MS_3$ | 1 | 1 | 0 | 1 | 1 |
| | $MS_4$ | 0 | 0 | 1 | 1 | 1 |
| INT | | 1 | 0 | 1 | 0 | 1 |
| NOR | | 0 | 0 | 0 | 1 | 0 |

INTERFACE CIRCUIT FOR ADAPTING A MULTI-SCAN MONITOR TO RECEIVE COLOR DISPLAY DATA FROM VARIOUS TYPES OF COMPUTERS

BACKGROUND OF THE INVENTION

1. Field of the Invention

The present invention relates generally to interface circuits and more particularly to a monitor interface circuit to be connected to a multi-scan display monitor which can display display data derived from various types of personal computers.

2. Description of the Prior Art

Different types of personal computers are adapted to generate digital display data of various modes, such as for example, display data mode in which 8 colors are displayed by the combinations of display data of 3 bits corresponding to three primary colors represented as R (red), G (green) and B (blue), a display data mode in which 16 colors are displayed by the combinations of display data of the above 3 bits (R, G, B) and an additional display data of 1 bit (I) for gray scale, a display data mode in which 64 colors are displayed by the combinations of respective colors each being formed of 2 bits, a display data mode in which a single color is displayed (so-called green monitor mode), and so on.

Display data, on the other hand, have various kinds of horizontal scanning frequencies, such as 15.734 kHz of the NTSC system, 21.8 kHz, 18.4 kHz, 30.12 kHz or the like.

Known display monitors have been produced as special types of display monitors in correspondence with the display modes of display data that the personal computers generate. So, when a user exchanges his personal computer for a different type of personal computer having different display data, the user is also required at the same time to exchange the display monitor. This is a disadvantage since a color display monitor is very expensive.

A multi-scan display monitor has been proposed in which the horizontal scanning frequency of an incoming display data signal is automatically discriminated and then the deflection device of the monitor is controlled in correspondence with the horizontal scanning frequency of the incoming display data signal. By using this multiscan display monitor, incoming display data signals of different horizontal scanning frequencies can be reproduced satisfactorily.

However, a monitor interface circuit to be connected to such a display monitor has not yet been proposed which can form predetermined video or display signals from incoming display data signals having different display modes.

OBJECTS AND SUMMARY OF THE INVENTION

Accordingly, it is an object of this invention to provide an improved monitor interface circuit to be connected to a display monitor.

It is another object of this invention to provide a monitor interface circuit to be connected to a multiscan display monitor which can be used more easily and more efficiently.

It is a further object of this invention to provide a monitor interface circuit to be connected to a multiscan display monitor by which the multi-scan display monitor can be utilized as a multi-standard computer display monitor.

According to one aspect of the present invention, there is provided a monitor interface circuit to be connected to a display monitor comprising:

(a) display data input circuit means for receiving various types of incoming display data signals derived from an external source;

(b) mode signal input circuit means for receiving mode information signals associated with said incoming display data;

(c) mode control signal generating means connected to said mode signal input circuit means for generating a plurality of mode control signals in response to each received mode information signal;

(d) signal mixing means for mixing said display data from said display data input circuit means in accordance with said mode control signals; and (e) signal output circuit means connected to said signal mixing means for deriving display signals corresponding to three primary colors of red, green and blue.

These and other objects, features and advantages of the present invention will become apparent from the following detailed description of the preferred embodiment that is to be read in conjunction with the accompanying drawings, in which like reference numerals identify like elements and parts.

DESCRIPTION OF THE PREFERRED EMBODIMENT

An embodiment of a monitor interface circuit to be connected to a multi-scan display monitor according to the present invention will hereinafter be described with reference to the attached drawings.

Generally, in the various types of popular personal computers, there is an established, corresponding relation between the mode of the display data and the horizontal scanning frequency thereof. That is, when the horizontal scanning frequency of the video display signals derived from the computer is 15.734 kHz, 16 colors are displayed by the combinations of 4 bits designated herein as (RGB+I) where I represents the intensity; when the horizontal scanning frequency is 18.2 kHz, a single color is displayed (green monitor display mode); and when the horizontal scanning frequency is 21.8 kHz or 30.12 kHz, 64 colors are displayed by the combinations of 6 bits designated herein as RGB+rgb. Further, as to the normal mode, in which 8 colors are displayed by the combinations of 3 bits represented as R, G, B, and the intensity mode in which 16 colors are displayed by the combinations of 4 bits represented as (RGB+I), any horizontal scanning frequency is available other than those mentioned above for the MS (multi-scan) mode.

Figures 1, 2:
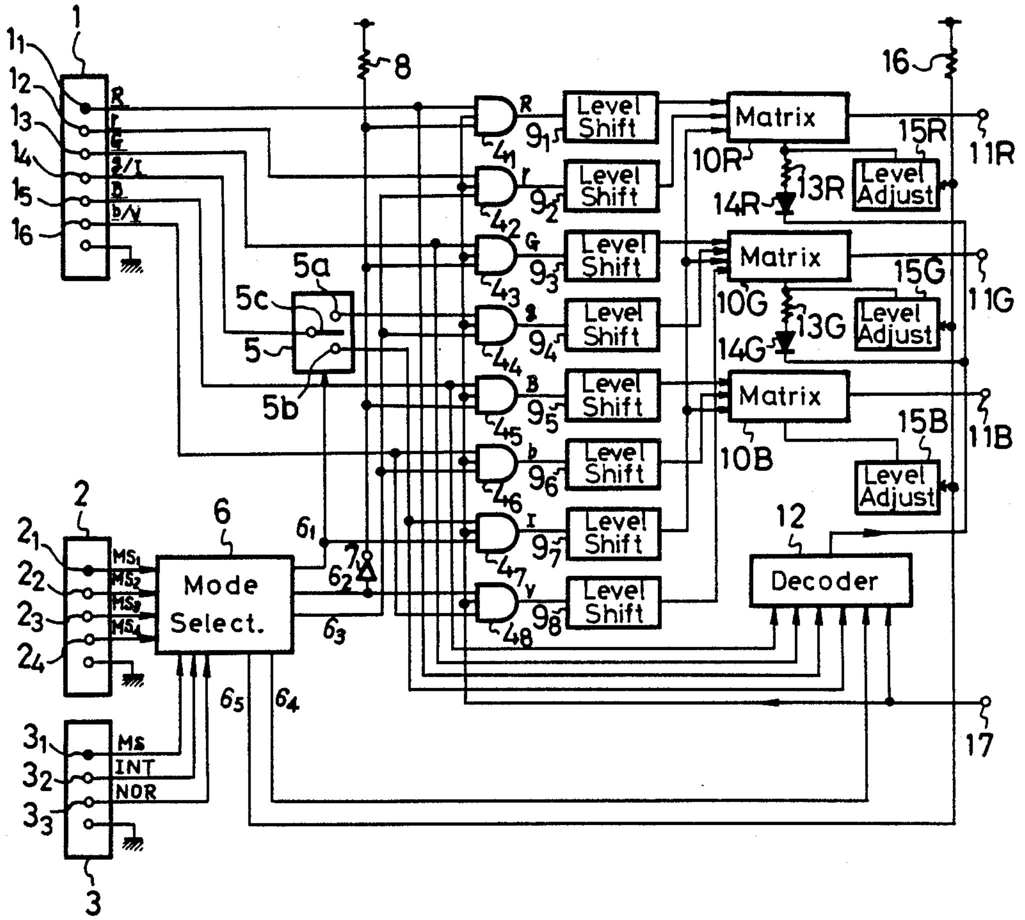
FIG. 1 is a block diagram showing an embodiment of a monitor interface circuit to be connected to a multiscan display monitor according to the present invention.
FIG. 2 is a truth table used to explain the operation of the monitor interface circuit of the invention shown in FIG. 1.

FIG. 1 is a block diagram showing an embodiment of a monitor interface circuit to be connected to a multiscan display monitor according to the invention. A terminal board 1 for receiving display data signals from an external source (not shown), such as a personal computer, is provided with a first terminal $1_1$, a second terminal $1_2$, a third terminal $1_3$, a fourth terminal $1_4$, a fifth terminal $1_5$ and a sixth terminal $1_6$. Depending on the color display capabilities of the particular computer as described above, the first terminal $1_1$ is supplied with a display data bit represented as R; the second terminal $1_2$ is supplied with a display data bit represented as r; the third terminal $1_3$ is supplied with a display data bit represented as G; the fourth terminal $1_4$ is selectively supplied with a display data bit represented as either g or I dependent on the mode selected; the fifth terminal $1_5$ is supplied with a display data bit represented as B; and the sixth terminal $1_6$ is selectively supplied, dependent on the mode, with a display data bit represented as either b or V (video) for displaying a B/W (green monitor display mode).

An input terminal board 2 is supplied from the external source (not shown) with horizontal scanning frequency information signals corresponding to the incoming display data signals. The terminal board 2 is provided with a first terminal $2_1$, a second terminal $2_2$, a third terminal $2_3$ and a fourth terminal $2_4$. Again, depending upon the display capabilities of the computer, the terminal $2_1$ is supplied with a mode signal $MS_1$ when the horizontal scanning frequency is 15.734 kHz; the second terminal $2_2$ is supplied with a mode signal $MS_2$ when the horizontal scanning frequency is 21.8 kHz; the third terminal $2_3$ is supplied with a mode signal $MS_3$ when the horizontal scanning frequency is 18.2 kHz; and the fourth terminal $2_4$ is supplied with a mode signal $MS_4$ when the horizontal scanning frequency is 30.12 kHz.

Another input terminal board 3 is supplied with mode selection data. The input terminal board 3 is provided with a first terminal $3_1$, a second terminal $3_2$ and a third terminal $3_3$. From a manual-type selection switch (not shown), the first terminal $3_1$ is supplied with a mode selection signal MS representing that the MS (multi-scan) mode is selected; the second terminal $3_2$ is supplied with a mode selection signal INT showing that the intensity mode is selected; and the third terminal $3_3$ is supplied with a mode selection signal NOR indicating that the normal mode is selected.

The terminals $1_1$ to $1_3$ of the input terminal board 1 are respectively connected to AND circuits $4_1$ to $4_3$ and the fourth terminal $1_4$ is connected through a change-over switch 5 to a separate input of one or the other of AND circuits $4_4$ or $4_7$. The change-over switch 5 is provided with one fixed contact 5*a* connected to a separate input of the AND circuit $4_4$, the other fixed contact 5*b* is connected to a separate input of the AND circuit $4_7$ and a movable contact 5*c* is connected to the terminal $1_4$ and selectively contacts either the fixed contact 5*a* or 5*b*. The fifth terminal $1_5$ of the input terminal board 1 is connected to an AND circuit $4_5$ and the sixth terminal $1_6$ is connected to AND circuits $4_6$ and $4_8$. The terminals $2_1$ to $2_4$ of the input terminal board 2 and the terminals $3_1$ to $3_3$ of the input terminal board 3 are all connected to separate input terminals of a mode selector circuit 6. The first output terminal $6_1$ of this mode selector circuit 6 is connected to the control terminal of the change-over switch 5 and also to a separate input of the AND circuit $4_7$. The second output terminal $6_2$ of the mode selector circuit 6 is connected to a separate input of the AND circuit $4_8$ and is also connected through an inverter 7 to separate inputs of the AND circuits $4_1$, $4_3$ and $4_5$. The third output terminal $6_3$ of the mode selector circuit 6 is connected to separate inputs of the AND circuits $4_2$, $4_4$ and $4_6$. Reference numerals 8 and 16 denote pull-up resistors connected to suitable bias sources as shown in more detail in FIG. 3.

The output terminals of the AND circuits $4_1$ to $4_8$ are respectively connected to level shifter circuits $9_1$ to $9_8$, each of which is adapted to level-shift a TTL (transistor-transistor logic) signal level of 5 V from each of the AND circuits $4_1$ to $4_8$ to a signal level of 2 V. The output terminals of the level shifter circuits $9_1$, $9_2$ and $9_7$ are connected to separate inputs of a matrix circuit 10R which generates a video or display signal of red R. The output terminals of the level shifter circuits $9_3$, $9_4$, $9_7$ and $9_8$ are connected to a matrix circuit 10G which generates a display signal of green G. The output terminals of the level shifter circuits $9_5$, $9_6$ and $9_7$ are connected to separate inputs of a matrix circuit 10B which generates a display signal of blue B. Output terminals 11R, 11G and 11B for the three primary colors are respectively led out from the matrix circuits 10R, 10G and 10B and the display signals corresponding to three primary colors of red R, green G and blue B therefrom are supplied to a multi-scan display monitor (not shown).

With this circuit arrangement, the mode selector circuit 6 generates output signals $6_1$ to $6_5$ shown, for example, in a truth table of FIG. 2 in response to the mode signals $MS_1$ to $MS_4$ and MS, INT and NOR applied to the respective terminals $2_1$ to $2_4$ and $3_1$ *to* 33 of the input terminal boards 2 and 3.

The manner in which these mode selector circuit output signals control the composition of the input display data signals will now be described. Firstly, when the manual-type selection switch (not shown) is placed in the MS mode and the horizontal scanning frequency associated with display data signals is 15.734 kHz, the mode (signal) $MS_1$ is selected and the first output signal $6_1$ of the mode selector circuit 6 becomes "1" and the second and third output signals $6_2$ and $6_3$ become "0", respectively. Therefore, the AND circuits $4_1$, $4_3$, $4_5$ and $4_7$ are turned on and the changeover switch 5 connects its movable contact 5*c* to the fixed contact 5*b* (connected to a separate input of the AND circuit $4_7$). Accordingly, on the basis of this mode $MS_1$, display data of the bits represented as R, G, B and display data of the bit represented as I (intensity) applied to the input terminals $1_1$, $1_3$, $1_5$ and $1_4$ are respectively supplied through the level shifter circuits $9_1$, $9_3$, $9_5$ and $9_7$ to the matrix circuits 10R, 10G and 10B from which the composed display signals R, G and B are supplied respectively to the output terminals 11R, 11G and 11B, so that 16 colors are displayed on the display monitor (not shown).

When the manual-type selection switch (not shown) is placed in the MS mode and the horizontal scanning frequency associated with display data signals is 21.8 kHz, the mode $MS_2$ is selected and the first and second output signals $6_1$ and $6_2$ of the mode selector circuit 6 both become "0" and the third output signal $6_3$ thereof becomes "1". Thus, the AND circuits $4_1$ to $4_6$ are turned on and the change over switch 5 connects its movable contact 5*c* to the fixed contact 5*a* (connected to a separate input of the AND circuit $4_4$). Accordingly, in the mode $MS_2$, display data of bits represented as R, G, B, r, g and b, applied to the terminals $1_1$ to $1_6$ of the input terminal board 1, are respectively supplied through the level shifter circuits $9_1$ to $9_6$ to the matrix circuits 10R, 10G and 10B, which generate the composed display signals corresponding to three primary colors of R, G and B and which are respectively supplied to the output terminals 11R, 11G and 11B, so that 64 colors are displayed on the display monitor (not shown).

When the manual-type selection switch (not shown) is placed in the MS mode and the horizontal scanning frequency associated with display data signals is 18.2 kHz, the mode $MS_3$ is selected and the first and second output signals $\mathbf{6}_1$ and $\mathbf{6}_2$ of the mode selector circuit 6 become "1" and the third output signal $\mathbf{6}_3$ thereof becomes "0". Therefore, the AND circuits $\mathbf{4}_7$ and $\mathbf{4}_8$ are turned on and the change-over switch 5 connects its movable contact 5*c* to the fixed contact 5*b* (connected to a separate input of the AND circuit $\mathbf{4}_7$). Accordingly, during the mode $MS_3$, display data bits represented as I and V from the terminals $\mathbf{1}_4$ and $\mathbf{1}_6$ are respectively supplied through the level shifter circuits $\mathbf{9}_7$ and $\mathbf{9}_8$ to the matrix circuit 10G from which a composed video signal of 4 levels of gradation is supplied to the output terminal 11G, thus displaying a single color (green) on the display monitor (not shown).

When the manual-type selection switch (not shown) is placed in the MS mode and the horizontal scanning frequency associated with display data signals is 30.12 kHz, the mode $MS_4$ is selected. In this case, as will be clear from the truth table of FIG. 2, the output signals $\mathbf{6}_1$ to $\mathbf{6}_3$ of the mode selector circuit 6 become the same as those for the case of the mode $MS_2$ and the same operation is carried out so that 64 colors are displayed on the display monitor (not shown).

When the manual-type selection switch (not shown) is placed in the intensity mode, the mode INT is selected and the first and third output signals $\mathbf{6}_1$ and $\mathbf{6}_3$ of the mode selector circuit 6 become "1" and the second output signal thereof becomes "0". Thus, the AND circuits $\mathbf{4}_1$ to $\mathbf{4}_7$ are turned on and the change-over switch 5 connects its movable contact 5*c* to the fixed contact 5*b* (connected to a separate input of the AND circuit $\mathbf{4}_7$). Accordingly, during the mode INT, the display data of bits R, G, B and I applied, respectively, to the terminals $\mathbf{1}_1$, $\mathbf{1}_3$, $\mathbf{1}_5$ and $\mathbf{1}_4$ of the input terminal board 1, are respectively supplied through the level shifter circuits $\mathbf{9}_1$, $\mathbf{9}_3$, $\mathbf{9}_5$ and $\mathbf{9}_7$ to the matrix circuits 10R, 10G and 10B from which the composed display signals, corresponding to the three primary colors of R, G and B, are supplied to the output terminals 11R, 11G and 11B; 16 colors thus being displayed on the display monitor (not shown).

In the intensity mode INT, incoming display data does not always take the form of 4 bits. Therefore, the AND circuits $\mathbf{4}_2$ and $\mathbf{4}_6$ are also turned on, so that the monitor interface circuit is able to receive incoming display data signals of other bits.

When the manual-type selection switch (not shown) is placed in the normal mode, the mode NOR is selected and the first to third output signals $\mathbf{6}_1$ to $\mathbf{6}_3$ of the mode selector circuit 6 all become "0". Thus, only the AND circuits $\mathbf{4}_1$, $\mathbf{4}_3$ and $\mathbf{4}_5$ are turned on. Accordingly, during the mode NOR, display data of the bits represented as R, G and B applied to the terminals $\mathbf{1}_1$, $\mathbf{1}_3$ and $\mathbf{1}_5$ of the input terminal board 1 are respectively supplied through the level shifter circuits $\mathbf{9}_1$, $\mathbf{9}_3$ and $\mathbf{9}_5$ to the matrix circuits 10R, 10G and 10B from which the composed display signals corresponding to the three primary colors of R, G and B are supplied to the output terminals 11R, 11G and 11B; thus, 8 colors are displayed on the display monitor (not shown).

According to the monitor interface circuit of the invention as described above, the display signal of a single color and the display signals of 8 to 64 colors are composed in response to the modes associated with the display data signals. In the case of the MS mode, the horizontal scanning frequency information associated with the display data signals are discriminated (by external circuitry not shown) and the respective modes can be switched automatically.

For personal computers which can be operated in the above mentioned MS mode, when the mode in which display data of the bit represented as I (intensity) is used (represented by the mode $MS_1$), dark yellow in the yellows formed by mixing display data of the bits represented as R and G and which is also formed by display data of the bit represented as I (intensity) is replaced with brown. The reason for this will be described. Since yellow is inherently high in lightness, yellow and dark yellow formed by display data of the bit represented as I are difficult to be distinguished from each other. Therefore, it is intended to widen a range of colors displayed by replacing the dark yellow with brown which can not be formed by display data of the above 4 bits.

In the monitor interface circuit as described above, the mode selector circuit 6 generates a fourth output signal $\mathbf{6}_4$ which becomes "0" only in the mode $MS_1$ and the mode INT. The incoming display data signals represented as R, G, B and I applied to the AND circuits $\mathbf{4}_1$, $\mathbf{4}_3$, $\mathbf{4}_5$ and $\mathbf{4}_7$ are also supplied to separate inputs of a decoder 12. This output signal $\mathbf{6}_4$ is supplied to a separate input of the decoder 12 which is then actuated. Predetermined portions of the matrix circuits 10R and 10G are connected through resistors 13R and 13G in series with diodes 14R and 14G, respectively, to the output terminal of the decoder 12. When display data signals associated with dark yellow in the presence of the above mentioned two modes $MS_1$ and INT is inputted, the output terminal of the decoder 12 becomes low in potential and hence the outputs of the matrix circuits 10R and 10G are attenuated by a predetermined ratio, thus displaying brown on the display monitor (not shown). While yellow is sometimes displayed in the form of light yellow and dark yellow in the INT mode other than the MS mode, it is now a general trend that display data signals corresponding to dark yellow be displayed by brown.

According to the above monitor interface circuit of the invention, upon composing the display data signals by using the bit I or the bits r, g, b, when lightness is selected, it becomes 100% when the above bits are added to the bits R, G and B. For this reason, lightness of the bits R, G and B themselves is determined as, for example, about 66%.

However, since the bit represented as I and the bits represented as r, g and b are not available in the mode NOR, lightness in the mode NOR will be lowered to 66% at maximum.

To remove this defect, the mode selector circuit 6 generates a fifth output signal $\mathbf{6}_5$ which becomes "0" only in the mode NOR as shown on the truth table of FIG. 2. The matrix circuits 10R, 10G and 10B are respectively provided with output level adjusting circuits 15R, 15G and 15B which are operated by the fifth output signal $\mathbf{6}_5$. Consequently, during the mode NOR, the output levels of the matrix circuits 10R, 10G and 10B are increased so that lightness of each color can be increased to 100%.

In the monitor interface circuit as described above, a signal BLK, provided by inverting a blanking pulse, is applied to a terminal 17. This inverted signal BLK applied to the terminal 17 is supplied to separate inputs of each of the AND circuits $4_1$ to $4_8$ and the decoder 12 to prevent undesired signals from being supplied to the output terminals 11R, 11G and 11B during the blanking period.

Figure 3:
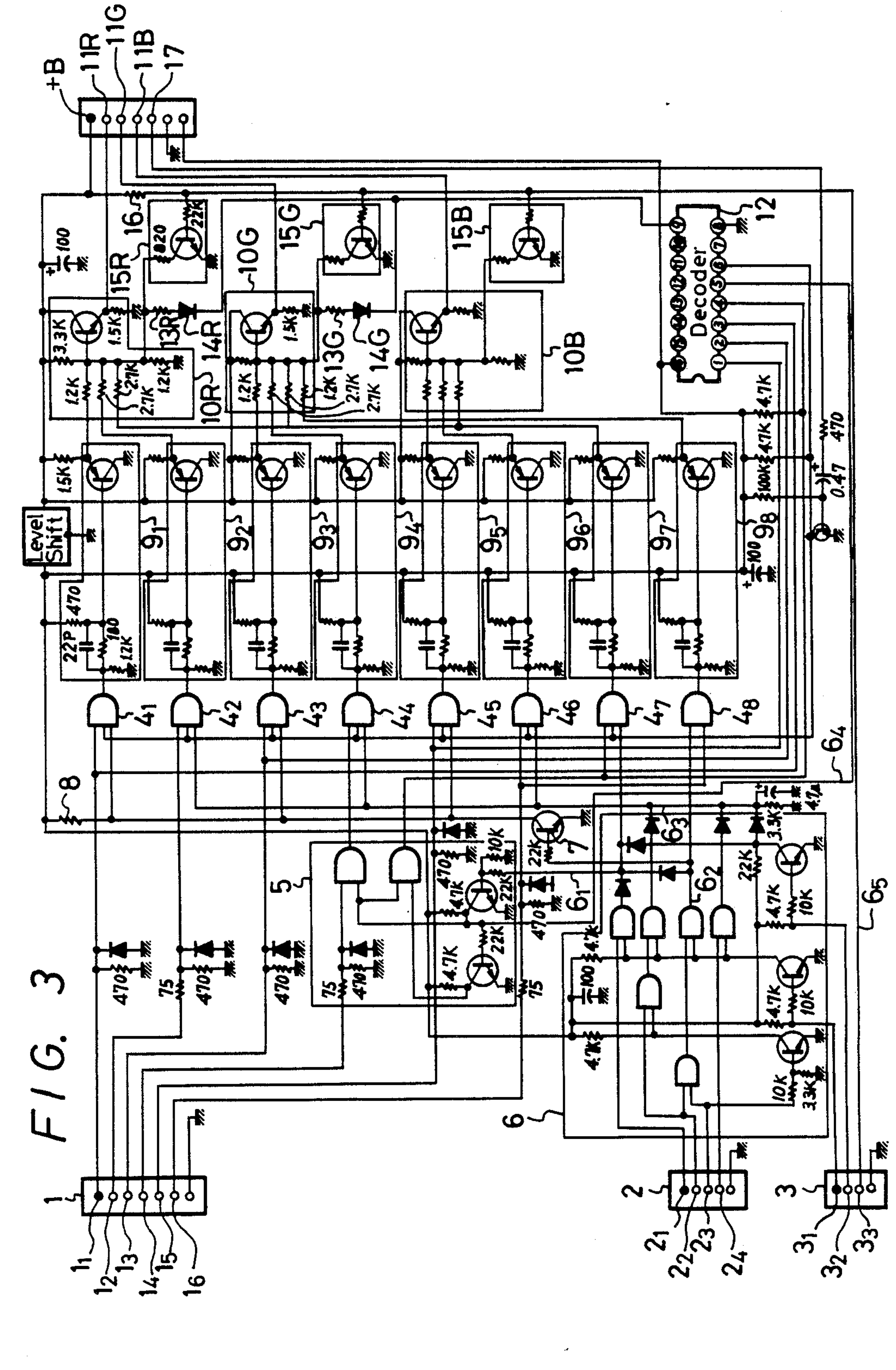
FIG. 3 is a schematic diagram of the monitor interface circuit shown in FIG. 1.

FIG. 3 is a schematic diagram showing a practical circuit arrangement of the monitor interface circuit shown in FIG. 1. Like parts corresponding to those of FIG. 1 are marked with the same references and will not be described. In FIG. 3, numerical values designate the values of the respective elements constituting the monitor interface circuit.

According to the present invention as set forth above, since the desired display signal can be formed in response to the mode of the display data signals, the horizontal scanning frequencies of the display data signals are discriminated by external circuitry and the mixing of the display data signals are controlled on the basis of the discriminated horizontal scanning frequency. The user is only required to input new display data signals in order for the display monitor to be used easily and efficiently with the new source of the display data signals.

The above description is given on a single preferred embodiment of the invention but it will be apparent that many modifications and variations could be effected by one skilled in the art without departing from the spirit or scope of the novel concepts of the invention so that the scope of the invention should be determined by the appended claims only.

We claim as our invention:

1. A monitor interface circuit for connection between one of a plurality of different types of external sources of display data signals and a display monitor in order to adapt the monitor to any one of the external sources, the interface circuit selecting only one of the different types of external sources, wherein the interface circuit comprises:

(a) display data input circuit means which is capable of receiving various types of incoming display data signals from any of the external sources;

(b) mode signal input circuit means which is capable of receiving mode information signals from any of the external sources which are associated with said incoming display data signals;

(c) mode control signal generating means connected to said mode signal input circuit means for generating a plurality of mode control signals in response to each received mode information signal;

(d) signal mixing means for mixing said display data signals from said display data input circuit means in accordance with said mode control signals; and (e) signal output circuit means connected to said signal mixing means for generating display signals for the monitor corresponding to three primary colors of red, green and blue.

2. A monitor interface circuit as recited in claim 1, wherein said mode signal input circuit means includes means capable of receiving different horizontal scanning frequency information signals with regard to said incoming display data signals.

3. A monitor interface circuit as recited in claims 1 or 2, wherein said display data input circuit means includes at least six terminals for receiving color display data signals represented as R, G, B, r, b and either I or g intensity signals.

4. A monitor interface circuit as recited in claim 1 or 2, wherein said signal mixing means includes a plurality of AND gates and three matrix circuits for said three primary colors, said matrix circuits are connected to the outputs of said AND gates and said mode control signals are supplied to said AND gates together with said incoming display data signals for deciding the combinations of said display data signals to be supplied to said matrix circuits.

* * * * *